May 21, 1968     T. E. GILLIGAN     3,384,765
BINARY SIGNAL VOLTAGE LEVEL STANDARDIZER
Original Filed Aug. 19, 1963     5 Sheets-Sheet 1

GRAPHICAL ANALYSIS OF BISTABLE INVERTER CIRCUIT

INVENTOR.
THOMAS E. GILLIGAN

May 21, 1968  T. E. GILLIGAN  3,384,765
BINARY SIGNAL VOLTAGE LEVEL STANDARDIZER
Original Filed Aug. 19, 1963  5 Sheets-Sheet 2

10 ns/DIV
NEGATIVE GOING INPUT SIGNAL

INVENTOR.
THOMAS E. GILLIGAN

POSITIVE GOING OUTPUT SIGNAL

POSITIVE GOING INPUT SIGNAL

NEGATIVE GOING OUTPUT SIGNAL

INVENTOR.
THOMAS E. GILLIGAN

May 21, 1968 T. E. GILLIGAN 3,384,765
BINARY SIGNAL VOLTAGE LEVEL STANDARDIZER
Original Filed Aug. 19, 1963 5 Sheets-Sheet 4
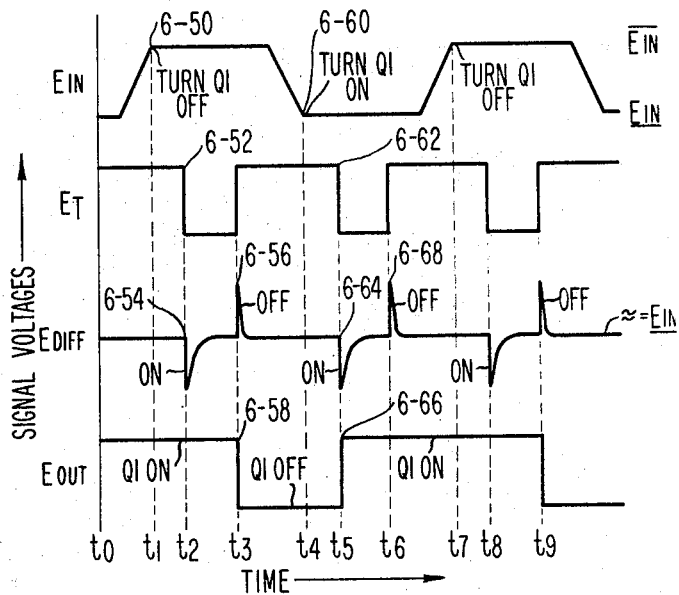
Fig.6B
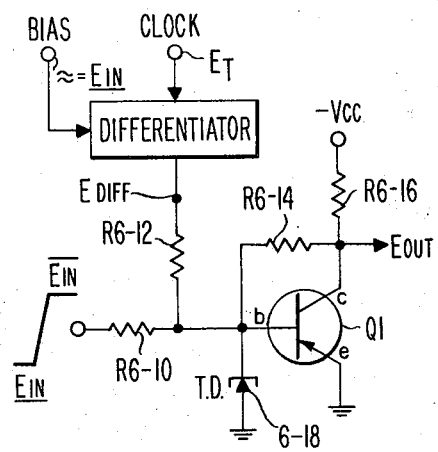
Fig.6A
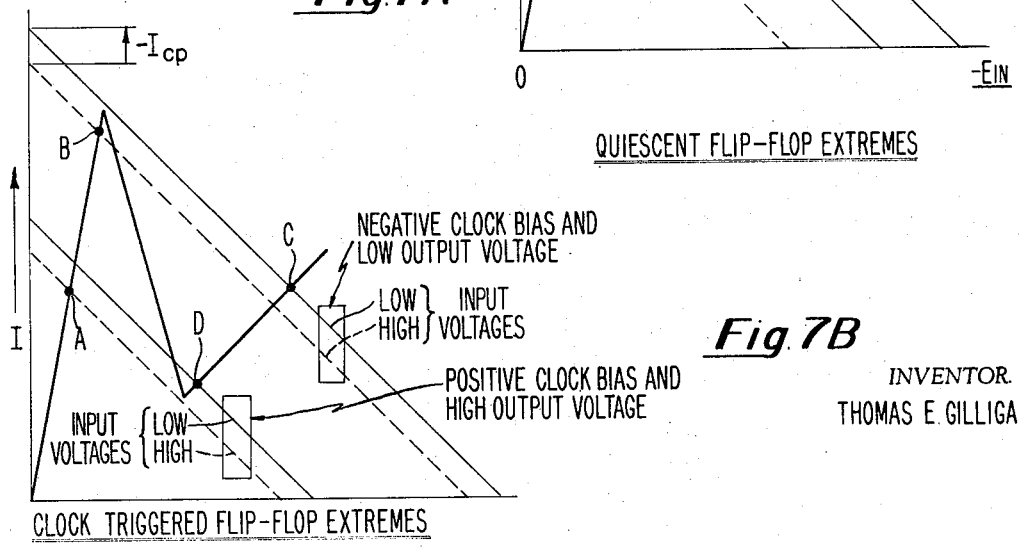
Fig.7A
Fig.7B
INVENTOR.
THOMAS E. GILLIGAN

United States Patent Office 3,384,765
Patented May 21, 1968

3,384,765
BINARY SIGNAL VOLTAGE LEVEL
STANDARDIZER
Thomas E. Gilligan, Havertown, Pa., assignor to Burroughs Corporation, Detroit, Mich., a corporation of Michigan
Continuation of application Ser. No. 303,029, Aug. 19, 1963. This application July 25, 1966, Ser. No. 567,683
3 Claims. (Cl. 307—268)

This application is a continuation of application S.N. 303,029 filed Aug. 19, 1963, and now abandoned.

This invention relates to the restandardizing or restoration of signal voltage levels. It is particularly concerned with the standardizing or restoring of binary voltage signal levels in a data-processing system.

In the field of data processing, especially in that portion of the field associated with digital computers, one of the prime concerns of the system designer is the maintenance of a fixed pair of signal levels which are to be considered as the binary signal voltage values. Variation of these binary levels could, of course, be considerably troublesome throughout the system unless some means were inserted to act as a reference for these binary values.

In any intricate binary electronic system where numerous strings of repetitive circuits are utilized, a problem which causes much difficulty is deterioration of binary voltage signal levels. While this problem is present in analog signal systems, the signal continuity associated therewith considerably reduces the seriousness of the trouble. It is in the digital system, where the information being relayed throughout the logical organization is in the form of two discrete levels, that its presence is most felt.

One of the prior solutions to the problem has been to use signal voltage levels which were the same as the power source levels. This was usually accomplished through the use of a saturated circuit condition for one discrete binary level and a circuit cutoff condition for the other. This solution, however, was not entirely satisfactory. One of the problems was the loss of operational speed by the circuits so operated. This loss is caused by the well-known time delays associated with transistor turn-on, turn-off and storage times. These inherent losses are at their peak in a bistable circuit operated between cutoff and saturation.

Recently in computer design there has been a quest for higher circuit operational speeds. This has been brought about mainly by the discovery of new electronic components whose speed has far exceeded the operational speeds realized in the circuits into which these components have been utilized. As a result of these improvements, much effort has gone into methods of realizing the improved component speed by circuit modifications which could approach the speed of the components. It was well known that operation of such circuits in their middle or "active" region was most desirable from the viewpoint of operational switching speed. However, the failure to provide a means to standardize a first and second voltage level within the middle region remained a barrier. A further impediment was the inability to restandardize and thereby maintain these levels throughout numerous circuit paths of the system.

A particular component which has had a significant impact on the improvement of circuit speed is the tunnel diode. This is a device which possesses a negative resistance in a portion of its characteristic curve. That is, for a particular increase in voltage applied to the tunnel diode, there is a corresponding decrease in current flow through the device. This negative resistance section resides between two sections of positive resistance in the diode current/voltage characteristic. In these positive resistance sections an increase in voltage through a device will result in a corresponding increase in the current. An important circuit application of the tunnel diode has been its use as a bistable device. This is achieved by designing the circuit with a load line passing through both positive resistance sections of the current/voltage characteristic of the diode. The bistable configuration is operated by increasing the voltage across the diode in its initial positive resistance section to achieve a corresponding increase in current. This continues until a critical peak current is exceeded. At this critical time there is a sudden shift from one positive resistance section to the other. In switching to this second positive region of the characteristic curve, the tunnel diode passes through its negative resistance region at an exceedingly high rate of speed. The switching rate is said to occur at the speed of light. This characteristic is utilized by the present invention to achieve the improved transistor switching speed.

The present invention utilizes the bistable characteristic of the tunnel diode in a unique manner. It is known that it is possible to switch a binary signal transistor circuit between its alternate levels at a speed which approaches the switching speed of the tunnel diode. This was accomplished by connecting the tunnel diode in its bistable operating mode to act as a switch across the input of a binary signal operated transistor circuit. However, in order to accomplish the return switching of the tunnel diode to its initial state required the use of either a bipolar input signal or some alternate resetting means. Thus, after the diode had been switched to its second state wherein the voltage drop across the diode was in its high state, it was necessary to reduce the voltage input signal to below its lower value in order to return the diode to its initial low voltage state. In the present invention the switching may be accomplished without such reduction of the input signal below its lower voltage state. Further, most former tunnel diode switched transistor bistable circuits merely used the switch to activate the transistor circuit between the usual binary levels of transistor cutoff and saturation, thereby retaining the speed disadvantages associated with such conditions. This is not so in the present configuration. As mentioned, it is well known that a transistor circuit which is operated continuously in its active region responds much more rapidly to signal variations than does a transistor circuit that is in either its cutoff or its saturated state. For example, before a transistor reaches saturated conduction, a certain amount of "turn on" time is consumed. Conversely, after a transistor had been driven into its saturated condition there is an inherent storage time which must be added to the turn-off time of the transistor circuit. This inherent additional time is the time necessary for the transistor to come out of its saturated condition. In the present invention, the storage time is never imposed and both the turn-off and the turn-on time are reduced by continuous operation of the transistor in its active region. Former schemes were unable to operate in this manner since the binary signal levels could not be standardized.

Further, the restandardizing of such binary levels after deterioration through a string of logical circuits was a problem and the present circuit is used repetitively throughout the system to restandardize the signal levels.

The present invention has still another advantage in that it enables the use of logical circuitry which heretofore could not be utilized.

Most prior logical circuits including input gates in which conventional diodes were used have such diodes connected in a manner which requires the input binary signal to overcome a certain amount of back bias before such gates can be operated. This is necessary to reduce the susceptability of the circuits to activation by spurious or noise signals.

Thus, a certain amount of time delay is purposely imposed at each gating junction throughout the computer to reduce the possibility of erroneous activation of said circuits.

The present circuit, itself, possesses a high degree of noise immunity. This allows the use of diode gates which are activated entirely by the input signal without the necessity of overcoming a back bias voltage. This noise immunity is achieved by the imposition upon the present circuit of a quality, probably best described as a hysteresis effect.

It is therefore the primary object of this invention to provide a circuit possessing the ability to create a standard set of binary voltage levels.

It is also an object of this invention to provide a circuit capable of restandardizing these binary signal levels throughout a digital system.

It is a further object of this invention to provide digital computer circuitry capable of satisfactory system performance which is operative in its region of highest switching speed, that is, operative in its "active" region.

It is a still further object of this invention to provide a restandardizing circuit having improved high speed switching characteristics.

It is still a further object of this invention to provide a binary voltage level restandardizing level which reduces error accumulation by accomplishing its standardizing action through inversion.

It is also an object of this invention to provide a restandardizing circuit wherein the speed of the transistor switching operation is substantially independent of the binary input signal.

It is also an object of this invention to provide a binary signal standardizing circuit possessing a high degree of immunity to erroneous switching activation in either direction by spurious or noise signal voltages.

It is also an object of this invention to provide a binary signal standardizing circuit which is entirely operative by said binary signal without need for additional resetting or clock signals to return the circuit to its initial state.

It is still a further object of the present invention to provide a basic gate circuit of the diode AND transistor OR configuration wherein the OR gating is performed with a common node which is activated without the usual need for overcoming a back bias associated with a diode configuration.

Various other objects and advantages will appear from the following description of several embodiments of the invention, and the novel features will be particularly pointed out hereinafter in connection with the appended claims.

The present invention provides a circuit capable of producing from a received unipolar binary signal having considerable noise and other unwanted spurious amplitude variations, a new and correspondingly inverted binary output signal possessing none of the undesired characteristics. In doing so, the invention improves the switching speed of the received signal, as well as reestablishing a pair of binary voltage level standards for use in the following portions of the system.

The following drawings accompany this description:

Figure 1:
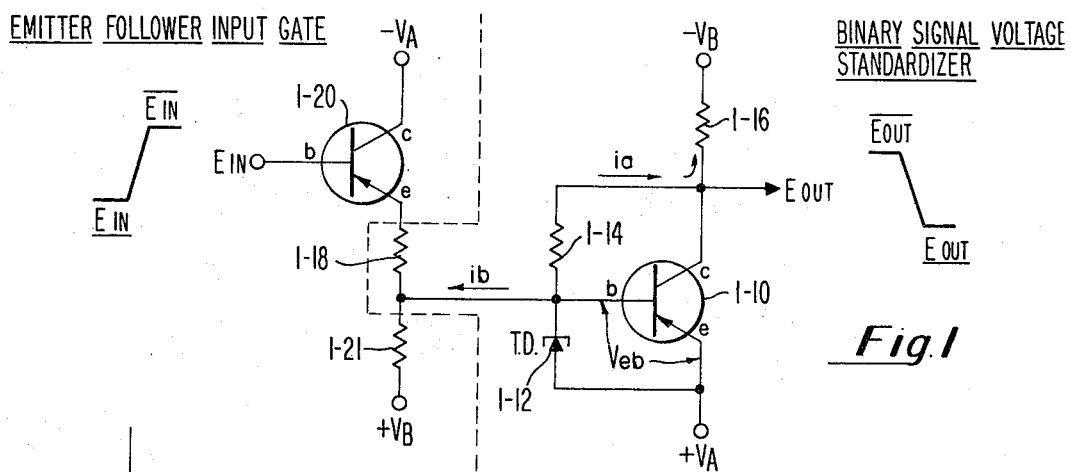
FIGURE 1 is a circuit schematic of a preferred configuration of the invention.
Figure 2:
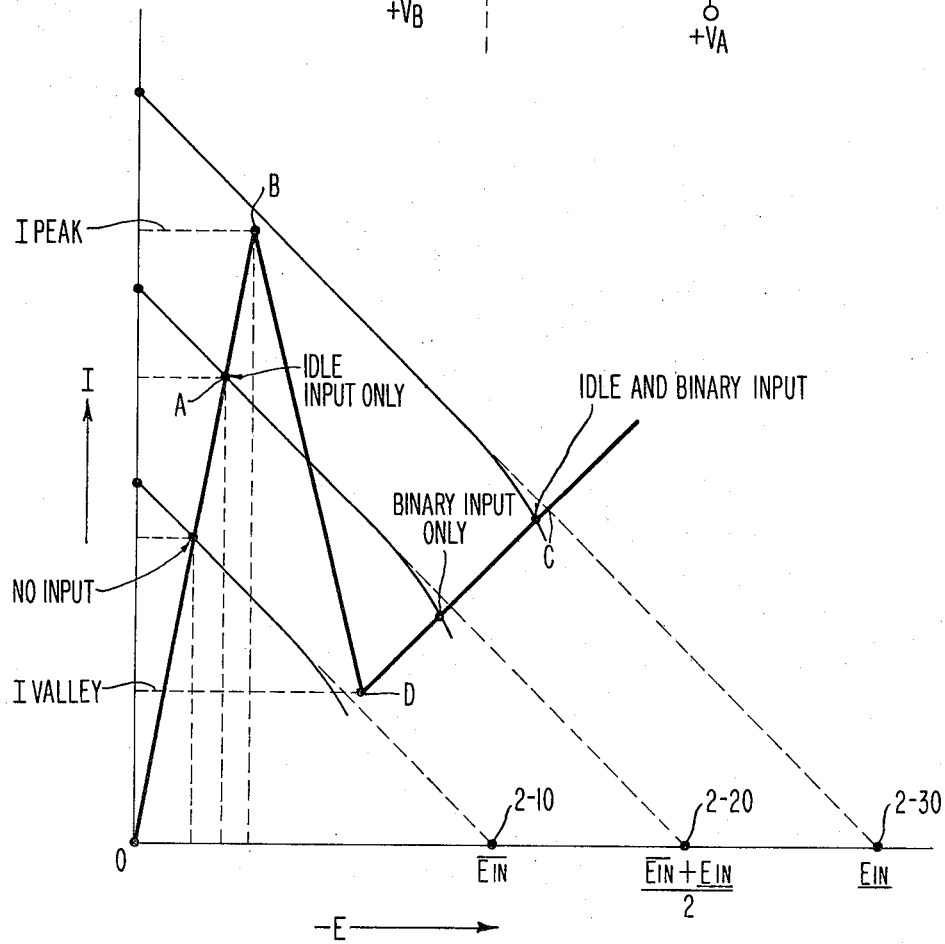
FIGURE 2 is a composite characteristic curve imposed on an idealized current/voltage characteristic curve of a typical tunnel diode for the full circuit operation cycle.
Figure 4A:
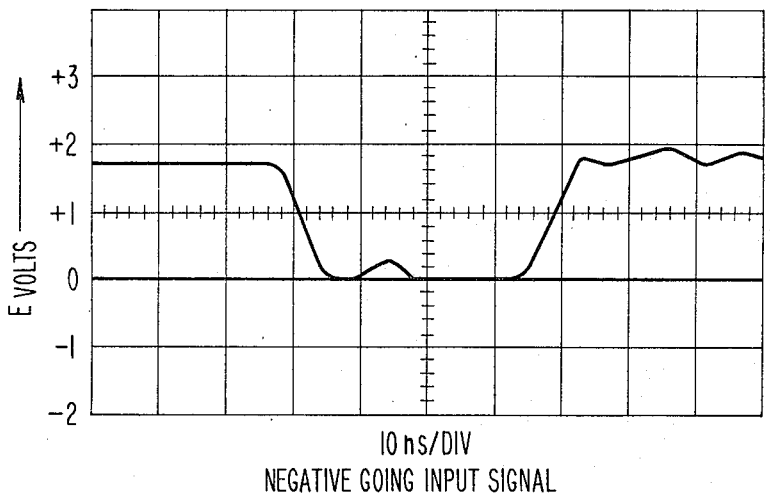
FIGURES 4A and 4B illustrate dynamic signal waveforms into and out of the circuit of FIGURE 1.
Figure 4B:
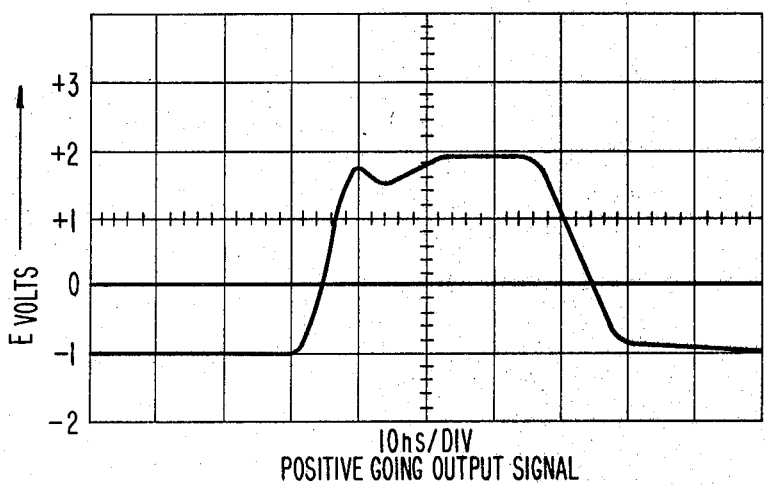
Figure 5A:
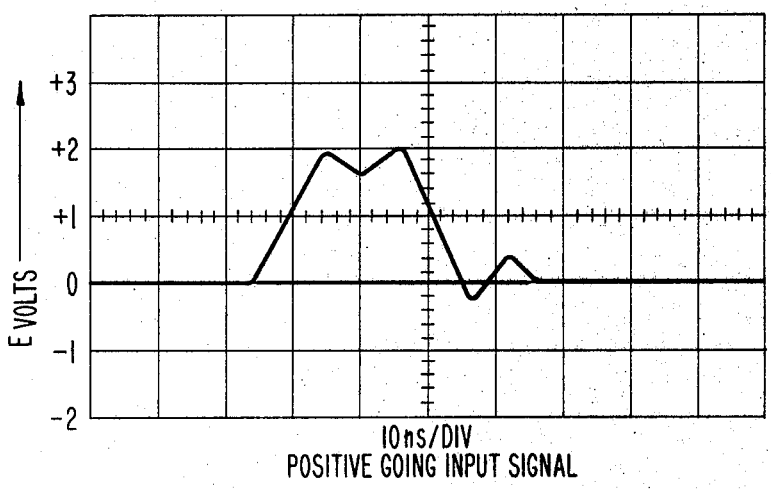
Figure 5B:
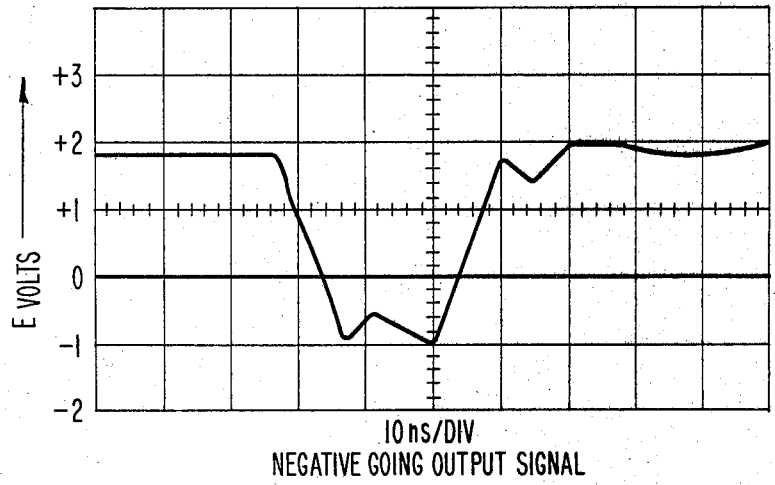

FIGURES 5A and 5B also illustrate dynamic signal waveforms of the FIGURE 1 circuit but the signals have higher repetition rates than those of FIGURES 4A and 4B.

FIGURE 6A is a schematic diagram of another embodiment, employing the inventive device.

FIGURE 6B illustrates the response waveforms taken of the circuit shown on schematic 6A.

FIGURES 7A and 7B are current/voltage characteristic curves of quiescent and trigger actuated states of the schematic diagram of FIGURE 6A.

Figure 8:
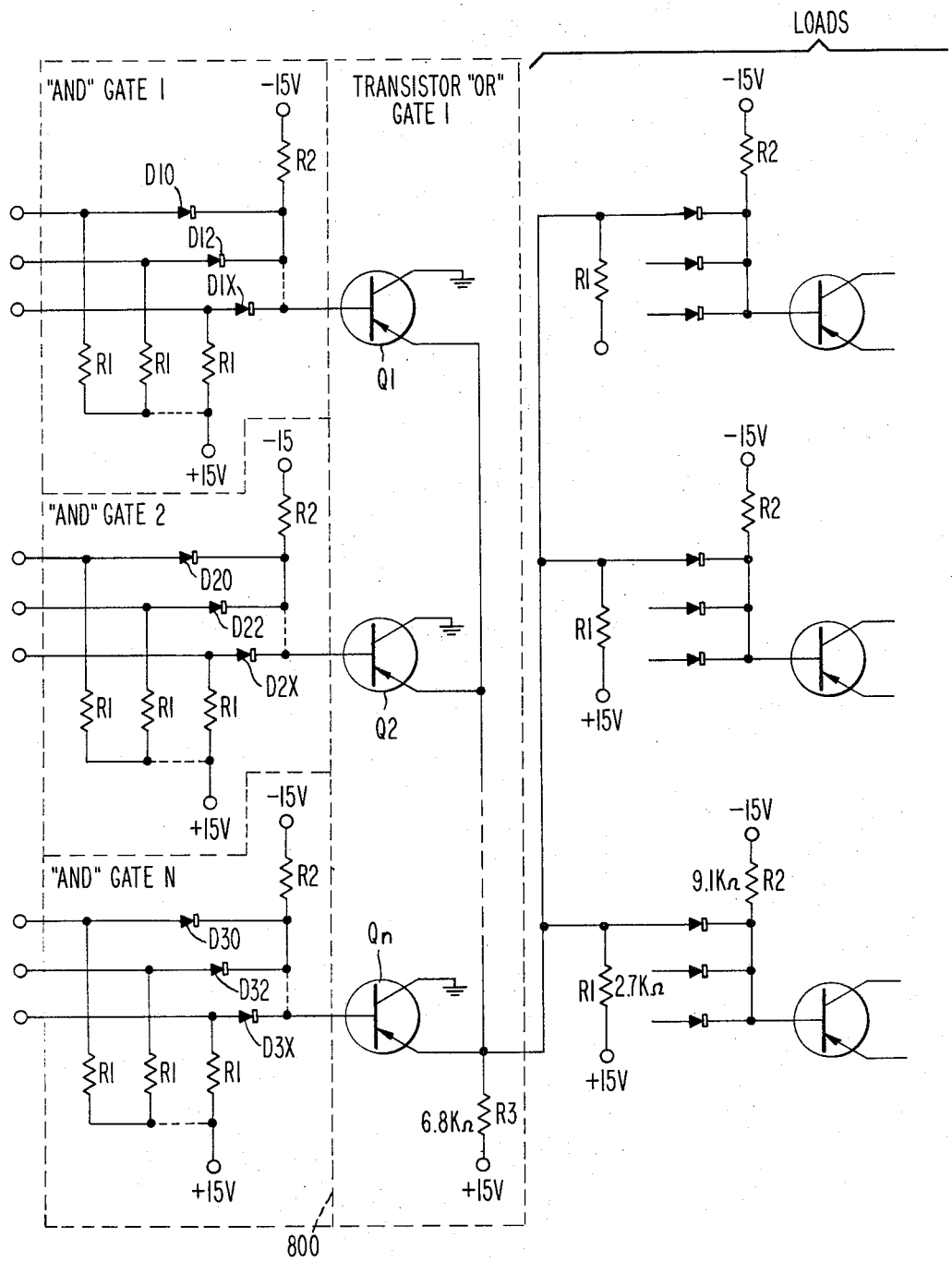

FIGURE 8 is a logical representation of possible circuit organization enabled by said inventive device.

Referring now in particular to FIGURE 1, the binary signal voltage inverter and standardizer is shown being operated from an emitter follower input gate. The standardizer section of the figure schematically illustrates the transistor 1–10 connected in the common emitter fashion having its emitter $e$ returned to a positive source of voltage $+V_a$. The collector $c$ of the transistor 1–10 is returned to a negative source of voltage $-V_b$ through the resistor 1–16. The resistor 1–14 is connected between the collector $c$ and the base $b$ of the transistor. The tunnel diode 1–12 is connected across and poled in the same direction as the emitter $e$-to-base $b$ junction of the transistor 1–10. The base $b$ of the transistor 1–10 is also connected to receive a binary input signal $E_{in}$ from the emitter follower input gate transistor 1–20. The higher positive level and the lower positive level of the binary signal are referred to as $\overline{E}_{in}$ and $\underline{E}_{in}$ respectively. The collector $c$ of the transistor 1–20 is returned to a negative voltage $-V_a$ which is equal to, but in the opposite direction of, the positive voltage $+V_a$ to which the emitter of transistor 1–10 is returned. The base $b$ of the transistor 1–20 is the input terminal to receive the binary input signal to be applied to the voltage inverter and standardizer. The emitter $e$ of the transistor 1–20 is returned to a positive voltage source $+V_b$, which is equal to, but of the opposite polarity of, $-V_b$, through a serially connected pair of resistors 1–18, 1–21. The base $b$ of the transistor 1–10 is connected to the junction of the serially connected resistors 1–18 and 1–21. The transistor 1–20, when the schematic of FIGURE 1 is operative, receives a plurality of binary signals, each through a diode.

The operation of this diode input gate is not the normally expected operation of gates associated with logical gate junctures in a digital computer. The present invention utilizes the input gate transistor in its active region continuously. Thus, the transistor 1–20 is operated entirely and continuously in its active region. It is never in its cutoff or its saturated condition. The operation of the transistor emitter follower and its input gates in this fashion has inherent disadvantages. In fact, it is these disadvantages which without the present invention have resulted in its rejection in prior systems. The prime disadvantage is the susceptibility of the gates to erroneous activation by noise or spurious signals.

The basic gate shown in FIGURE 8 is a diode-AND, transistor-OR configuration, evolved from the hybrid transistor-diode logic technique, with the OR performed at the common-emitter node of emitter-followers fed by each AND gate of the functional block. The circuit is a non-saturating, non-cutoff, emitter-follower, and thus takes full advantage of the gain-bandwidth capability of the transistor. For any static combination of signals, a low-impedance path exists from the controlling inputs to the output set up by the inputs. The importance of this path can be appreciated by noting that there is no reference threshold for any node to clamp on, so that current flows in all of the controlling diodes, and in the output emitter-follower. The only diodes cut off are those receiving signals which are in opposition to the signals currently holding the output level. Thus, input changes are admitted directly to the gating nodes, without the necessity for overcoming a back-biased switch, and speed is enhanced. Since this technique provides little noise immunity in the gate, standardizing circuits with good noise immunity were required between cascades of limited length. The present invention was devised to satisfy this requirement. Instability of the emitter-followers must also be considered, but this problem reduces basically to a layout and packaging burden, with means made available for local suppression of oscillations where they cannot be eliminated by design.

In the configuration shown in FIGURE 8, the emitter-follower current source is split among the input sources of the driven gates and the small standby source at the emitter itself. Each input source is capable of charging the expected stray and wiring capacitance and the node capacitances of its own gate within a 10 nanosecond response limit, in the event that a rapid rise at the base cuts off the emitter-follower. The base-node current source must be capable of discharging the emitter node with the minimum-$\beta$ (beta) transistor, in the event that diodes are cut off by a rapid negative transition.

The diode forward voltage drop and the transistor emitter-to-base voltage must be matched as nearly as is economically feasible over the extents of their operating ranges. Therefore, diode drops over a conduction range between 1 ma. (milliamp) and 3 ma. must be of the same order of magnitude as emitter-junction drops over an emitter-current range of 7 ma. to 20 ma. High-speed germanium diodes have been found to fit the requirement reasonably well in conjunction with high gain-bandwidth germanium transistors of the 2N964 class, yielding attenuation on the order of 50 mv. per stage, requiring standardization after ten AND-OR stages.

The need previously mentioned for a high-speed, noise-immune voltage standardizer would be, ideally, a bistable circuit having low gain except during the transient regenerative switching period.

Figure 3A:
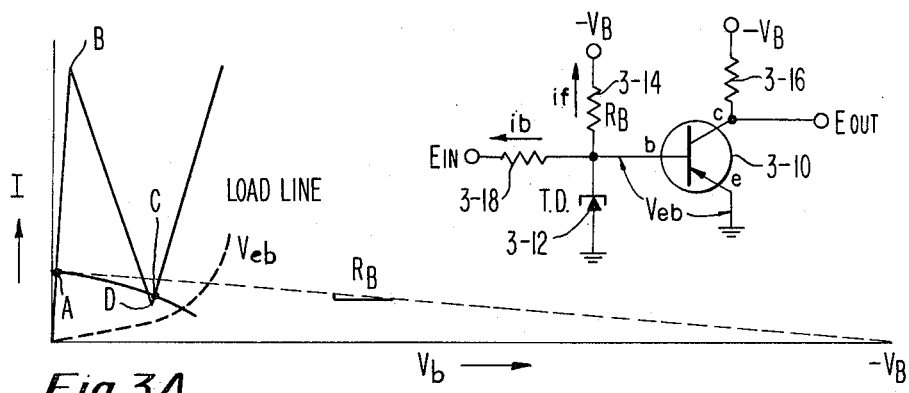
FIGURES 3A and 3B are composite characteristic curves of the tunnel diode and transistor circuit with their respective circuits shown on the right hand side of their corresponding waveforms.
Figure 3B:
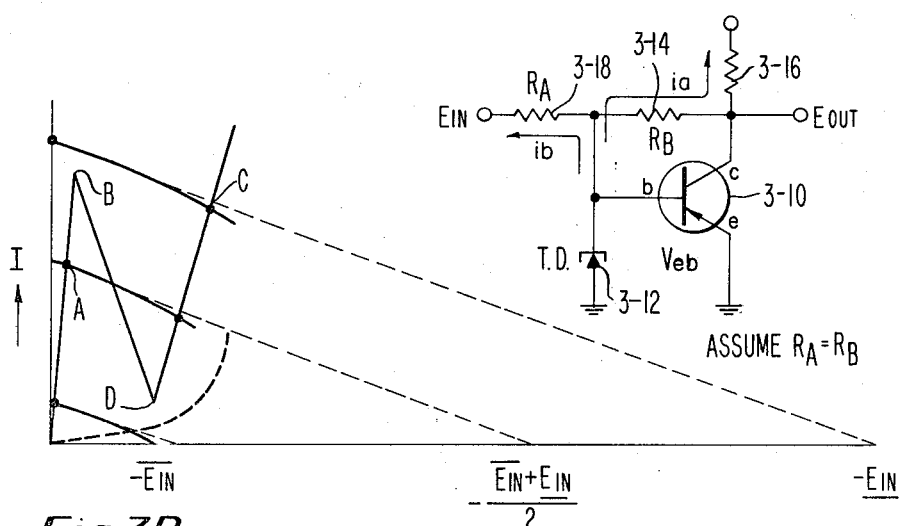

To meet this demand, the present inventive circuit shown in FIGURE 3B was developed. In FIGURE 3A, the basic principle governing bistable operation of a transistor by a tunnel diode is illustrated. The tunnel diode load line is a composite of the negative current source and the emitter junction in parallel, and two stable operating points are possible, one with the emitter at nearly zero bias and the other with as much forward bias as is necessary to turn the transistor on. Switching can be accomplished by varying the bias load line slope or intercept. This is done by connecting a signal current source into the base node. The impedance of this source must be sufficiently low that the minimum possible signal is capable of unaided switching of the tunnel diode.

In the inventive circuit shown in FIGURE 3B, the bias is made to depend upon both the input and output states of an inverter. If the resistors $R_A$ (3–18) and $R_B$ (3–14) are assumed equal, for the sake of simplicity, the effective bias source is a resistance of one-half the $R_A + R_B$ value, returned to a source voltage halfway between the input and output ($E_{in}$, $E_{out}$) terminal voltages of the inverter. When the input and output voltages are at opposite extremes, the load line is centered in a bistable position, and the circuit is stable in the condition to which it was last switched. The presence of the resistor $R_B$ (3–14) connected between $b$ and $c$ of transistor 3–10 makes it possible to switch the bistable circuit either up or down with a simple level change at the input, without need for either bipolar signals or separate resetting pulses.

If the initial voltage level at the input is low $\underline{E}_{in}$, and the output high $\overline{E}_{out}$, the tunnel diode 3–12 is in its high-voltage state, and the transistor 3–10 is on. Then, when the input voltage $\overline{E}_{in}$ rises, with the output voltage already high $\overline{E}_{out}$, the tunnel diode 3–12 switches to the low voltage state, switching the transistor 3–10 off. The output voltage then falls $\underline{E}_{out}$, and returns the circuit to a quiescent condition. Although the circuit in this condition permits a high current through the tunnel diode due to the voltage which is low at the collector of transistor 3–10, it is understood that the magnitude of current is insufficient to cause the tunnel diode to exceed its peak.

Finally, when the input signal voltage falls again $\underline{E}_{in}$, with the low voltage output $\underline{E}_{out}$, the combined current $ib$ and $ia$ drawn through the input resistor 3–18 and resistor 3–14 exceeds the peak current of the tunnel diode 3–12, switching it to its high voltage state and turning the transistor 3–10 back on.

The noise rejection of such an inverter is better than one-half the minimum switching signal swing because of the hysteresis effect contributed by the switching of the tunnel diode. For maximum response speed, as previously discussed, the transistor circuit is designed to operate non-saturating and non-cutoff.

The final version of the circuit is illustrated in FIGURE 1. The input levels $\underline{E}_{in}$ and $\overline{E}_{in}$ represent the minimum swing expected after attenuation and shift of the output level through a cascade of logic as long as ten stages. The shift is positive through the gates described previously, so that the upper limit $\overline{E}_{in}$ is always exceeded in practice. The lower limit $\underline{E}_{in}$ allows a shift of about 1.8 v. from the output of one standardizer circuit to the input of the next one located ten logic stages later. The first stage of logic, as illustrated in FIGURE 8, shifts the lower level to about +0.2 v., because of the clamping action imposed by the connection to ground of the collectors of emitter-follower transistors $Q_1, Q_2 \ldots Q_n$. Then, to pass through nine more stages, such as is shown in FIGURE 8, with less than 0.8 v. of shift, the shift per stage need only be less than 90 mv. (millivolts). This requirement can be easily met by the transistor-OR gate of FIGURE 8.

The signal traces of FIGURES 4A and 4B show the response of a model of the circuit to an input swing, FIGURE 4A, of 0 to +1.8 v. The inverted output of FIG. 4B swings from −0.9 to +1.8 v. The waveform of FIG. 4A shows a negative-going input pulse at a relatively low repetition rate producing the output positive-going waveform of FIG. 4B. The FIGURES 5A and 5B show a positive-going input pulse (FIG. 5A) at a higher repetition rate producing a negative-going output pulse (FIG. 5B). The identical characteristics of corresponding edges of the FIGS. 4A and 5A and of FIGS. 4B and 5B indicate that the circuit is dependable from D.C. up to at least a 40-mc. switching rate. (The time scale is 10 ns. per centimeter.) The circuit delay between FIGS. 4A and 4B and FIGS. 5A and 5B is about 3 ns. in response to an input rise, and 4 ns. at the fall. The output rise and fall times are on the order of 5 ns., without a load. An output emitter-follower can maintain this rise time under load at the expense of an additional delay of 1 or 2 ns.

The second embodiment, a clocked, single-output, single-input flip-flop circuit shown in FIG. 6A has also been derived from this circuit. Its waveforms are shown in FIGURE 6B. The input resistors form two parallel branches, one branch resistor 6–10 receiving signal information, the other resistor 6–12 carrying a bias which provides bistable operation, with a bipolar clock pulse ET superimposed. The signal resistor 6–10 and idle current resistor 6–14 branches are designed to provide so little current that they do not disturb the bistable bias between clock pulses. The clock amplitude is insufficient to exceed the tunnel-diode 6–18 switching points of FIGURE 7B if the input $E_{in}$ and output $E_{out}$ of the circuit are at opposite levels. However, if the input and output are both high $\overline{E}_{in}$ and $\overline{E}_{out}$, they reinforce the positive clock swing sufficiently to cut the tunnel-diode 6–18 current below its valley point D, in FIGURE 7B. Similarly, low input and low output, at the time of the negative clock, are sufficient to switch the diode over point B of FIG. 7B, its peak. Therefore, an information change cannot affect the output until the arrival of a clock pulse doublet, for example, the differentiator voltage $E_{diff}$ at reference points 6–56 and 6–64 of FIGURE 6B. Similarly, a clock pulse does not affect the output unless the information indicates that the output should change. A complementary output can be provided, if necessary, by adding the inverter described previously.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A binary signal level standardizer comprising: a pair of serially connected resistors having a single common connection junction point and a first and a second end terminal, a power source connected to said first end terminal, a tunnel diode connected to said second end terminal, said tunnel diode to be normally conducting through said pair of serially connected resistors in a first voltage mode, a single source of binary pulses to provide a train of pulses each having a leading and a trailing edge, a further resistor connected between said single source of binary signal pulses and said second end terminal of said pair of serially connected resistors, a transistor having an emitter, a base, and a collector electrode, said base electrode also connected to said second end terminal, said collector electrode connected to the single common connection junction point between said pair of serially connected resistors, said further resistor and the resistor connected between the base and collector electrodes having substantially equal resistance values, said emitter electrode connected to a reference potential, said tunnel diode being activated to a second voltage mode upon receipt of the leading edge of each pulse in said train of pulses from said binary source to cause said transistor to be responsively switched by said change in voltage mode of said tunnel diode and said tunnel diode being actively returned to its first voltage mode upon receipt of the trailing edge of each pulse to provide a standardizer capable of binary activation solely dependent upon the train of input pulses from said single source.

2. A binary signal voltage level standardizer and inverter circuit having a first and a second stable state comprising a unipolar square wave input voltage source, a transistor having an emitter, a base, and a collector electrode, an output resistor connected between a fixed voltage source and said collector electrode, a reference voltage source connected to said emitter electrode, a common terminal junction, a tunnel diode oriented in the same poled direction as the transistor emitter and base electrodes and having two tunnel diode electrodes with one connected to said emitter electrode and the other to said junction, a single unbypassed feedback resistor connected between said collector electrode and said junction, a direct connection from said junction to said base electrode, and an input resistor having a resistance value substantially equal to the resistance of said feedback resistor and having two terminals with one terminal connected to said junction and the other terminal directly connected to said unipolar square wave input voltage source to enable each successive voltage level change of each of the square wave pulses to cause the said circuit to switch from one of its two stable states to its other stable state.

3. A circuit as recited in claim 2 wherein said source of square wave pulses is comprised of an emitter follower transistor circuit in which said input resistor comprises a load resistor for said emitter follower circuit and including an emitter source of supply voltage for said emitter follower circuit of a polarity of reverse bias with respect to the poled direction of said tunnel diode orientation.

References Cited
UNITED STATES PATENTS

| | | | |
|---|---|---|---|
| 3,171,979 | 3/1965 | Corsiglia | 307—88.5 |
| 3,185,864 | 5/1965 | Amodei | 307—88.5 |
| 3,218,466 | 11/1965 | Walsh et al. | 307—88.5 |

OTHER REFERENCES

GE Tunnel Diode Manual, first edition, 1961, pp. 48–49.

JOHN S. HEYMAN, *Primary Examiner.*

ARTHUR GAUSS, *Examiner.*

J. ZAZWORSKY, *Assistant Examiner.*